Jan. 1, 1924
S. A. THOMAS ET AL
SLICING MACHINE
Filed Oct. 14, 1922
1,479,756
3 Sheets-Sheet 1
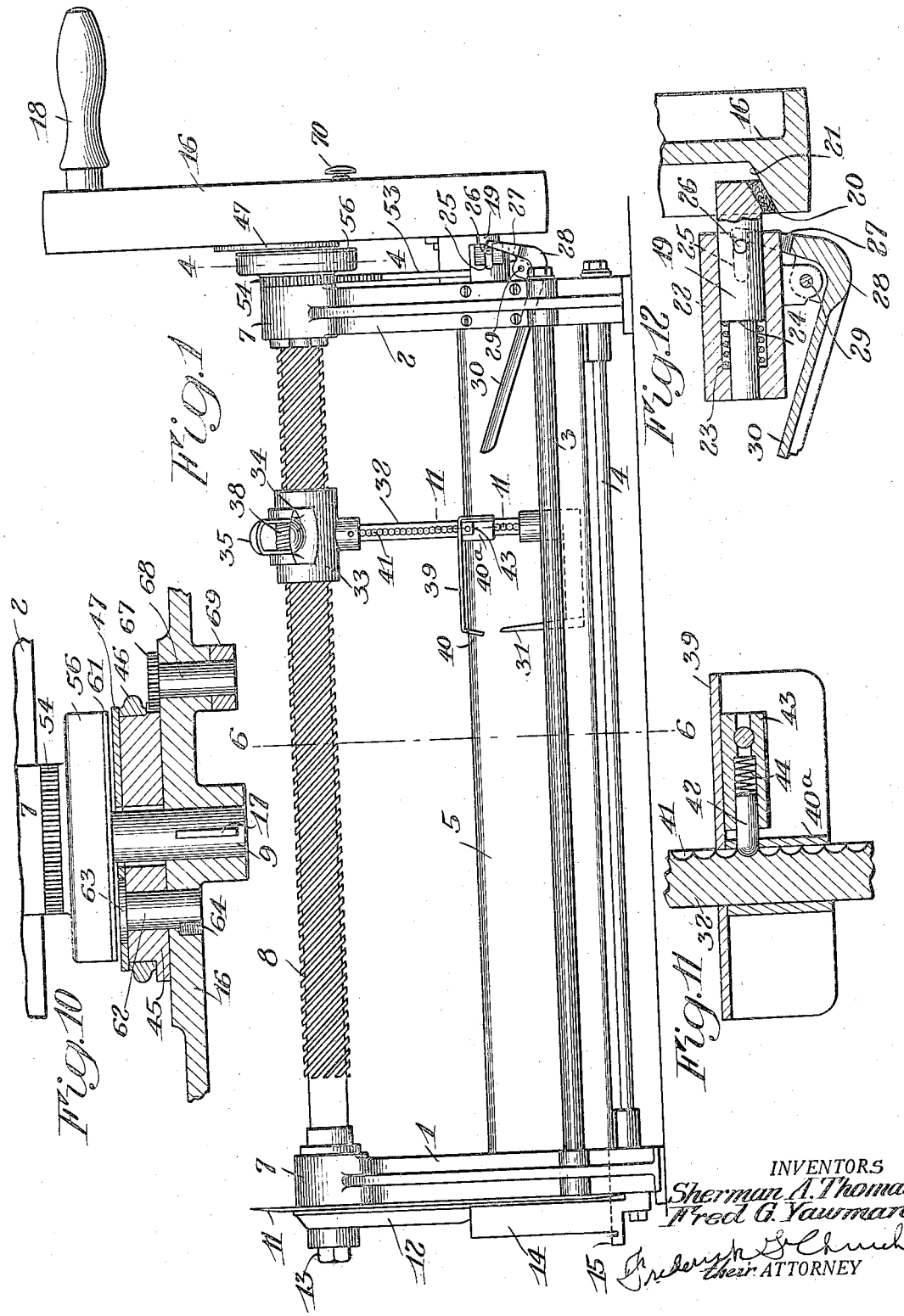
INVENTORS
Sherman A. Thomas
Fred G. Yawman
Frederick S. Church
their ATTORNEY

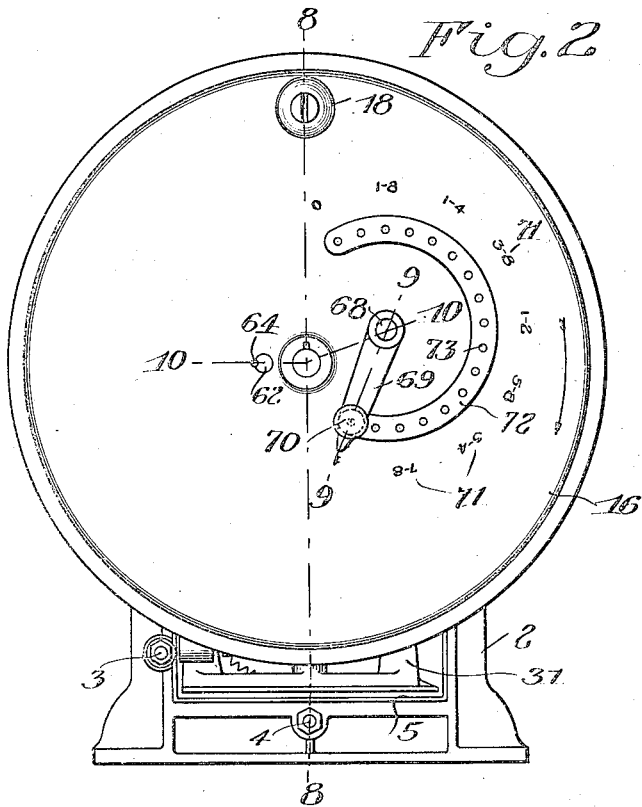
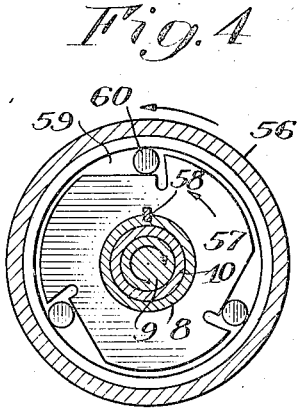
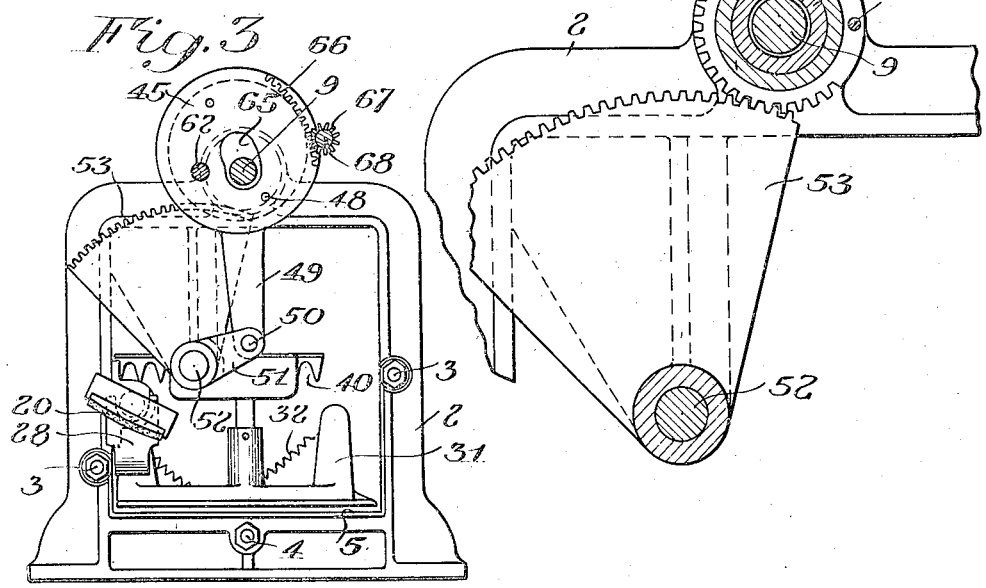

Jan. 1, 1924. 1,479,756
S. A. THOMAS ET AL
SLICING MACHINE
Filed Oct. 14, 1922   3 Sheets-Sheet 3
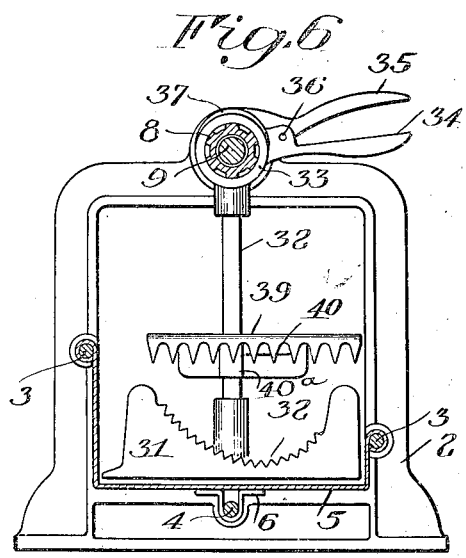
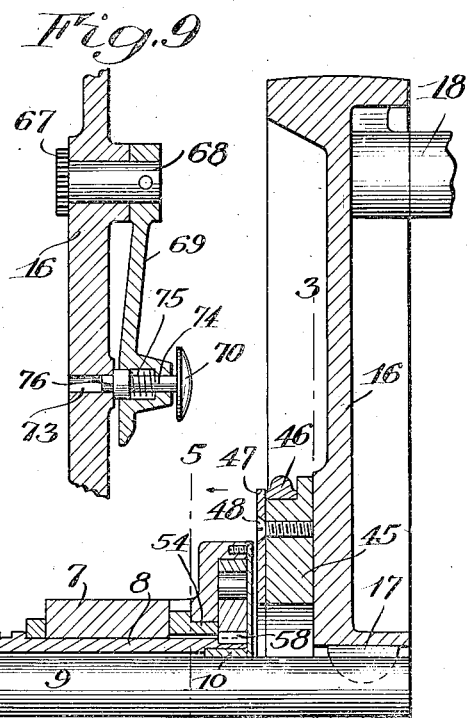
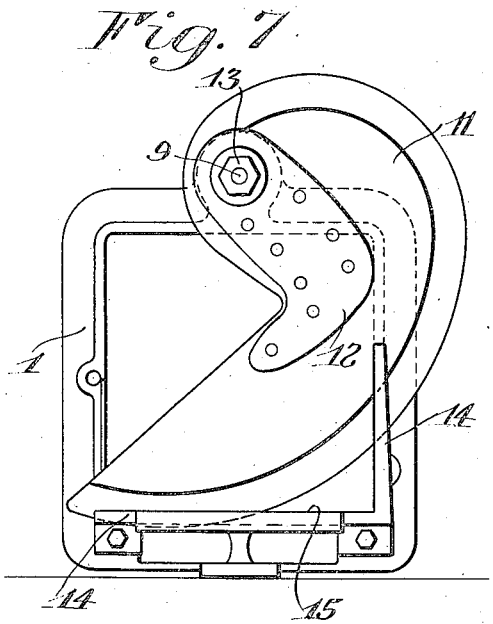
INVENTORS
Sherman A. Thomas
By Fred G. Yawman
Their ATTORNEY Patented Jan. 1, 1924.

1,479,756

UNITED STATES PATENT OFFICE.

SHERMAN A. THOMAS AND FRED G. YAWMAN, OF ROCHESTER, NEW YORK, ASSIGNORS TO CHARLES F. MORLEY, OF ROCHESTER, NEW YORK.

SLICING MACHINE.

Application filed October 14, 1922. Serial No. 594,585.

*To all whom it may concern:*

Be it known that we, SHERMAN A. THOMAS and FRED G. YAWMAN, citizens of Rochester, in the county of Monroe, State of New York, have invented certain new and useful Improvements in Slicing Machines, of which the following is a specification.

Our present invention relates to slicing machines of the type employing a work guide and a rotary knife into which latter meat, bread and similar materials are intermittently fed and the invention has for its object to provide a simple, durable and efficient machine of this character that will be safe and convenient to adjust and to operate. The improvements are directed in part toward the feeding mechanism for the work and its adjustments and toward so disposing the operating mechanism that the user will be prevented from getting his hands in contact with the rotating knife. To these and other ends the invention consists in certain improvements and combinations of parts, all as will be hereinafter more fully described, the novel features being pointed out in the claims at the end of the specification.

In the drawings:

Figure 1 is a side view of a slicing machine constructed in accordance with and illustrating one embodiment of our invention, the guard or housing for the knife being removed.

Figure 2 is an elevation of the driving end of the machine.

Fig. 3 is a similar view with the fly wheel removed and in section through the drive shaft on the far side thereof.

Fig. 4 is an enlarged sectional view through the clutch of the feeding mechanism.

Fig. 5 is an enlarged sectional view through another fragment of the feeding mechanism.

Fig. 6 is a transverse section taken substantially on the line 6—6 Fig. 1.

Fig. 7 is an elevation of the cutting end of the machine.

Fig. 8 is an enlarged fragmentary axial section through the fly wheel and adjacent parts on the line 8—8 of Figure 2.

Fig. 9 is an enlarged fragmentary detail section on the line 9—9 of Fig. 2.

Fig. 10 is an enlarged fragmentary detail section on the line 10—10 of Fig. 2.

Fig. 11 is an enlarged fragmentary detail section through a portion of the work holder on the line 11—11 of Fig. 1 and Fig. 12 is an enlarged detail section through a portion of the frame showing a locking device for the driving mechanism.

Similar reference numerals through the several views indicate the same parts.

As we have before indicated our present improvements are applicable to slicing machines generally but are particularly applicable to bread slicers in which a loaf of bread is inserted and cut into uniform slices of any desired thickness. We have illustrated such a machine and will describe it in this connection.

The machine shown in the drawings is of the type adapted to be placed on a table or bench and is operated by hand as such machines usually are. It comprises two end frames or supporting castings 1 and 2 between which extend rigid rods 3 and 4 at the sides and bottom constituting a frame by which the bread pan or work guide 5 is carried and rigidly held. A bracket 6 spot welded to the bottom of the pan embraces the bottom rod 4.

At the top of each frame 1 and 2 is a bearing 7 in which is supported a worm 8 constituting part of the feeding mechanism of the machine and extending longitudinally of and above the bread pan or work guide 5. The drive shaft 9, separated from the worm by bushings 10 and independently rotatable, extends centrally through the worm to project at both ends thereof. At the cutting end beyond the frame 1 it carries the usual type of knife or slicer 11 the blade of which is secured to a back 12 that is fixed to the shaft by a nut 13. The blade swings through a suitable guide 14 and its path extends slightly below the level of the bottom of the work guide or bed pan 5 as indicated at 15 in Fig. 7. With the exception of any opening in alignment with the work guide through which the sliced material passes the knife is normally covered and protected by a suitable housing not shown but known in the art.

At the opposite or driving end the shaft 9 beyond the frame 2 carries a fly wheel 16 locked thereto by a key 17 and fitted with a handle 18 by means of which the shaft and machine are manually operated as usual.

The crank is naturally turned with one hand as the operator faces the machine and after the bread has been adjusted for feeding in the work holder hereinafter described there is danger that the operator's other hand, being idle will be inserted beneath the knife for some purpose. We therefore provide employment for this other hand necessary to the continued operation of the machine and located at a safe distance from the knife so that both hands will be required to operate the machine in such a way that neither can possibly be inadvertently placed in the path of the knife. To this end we provide a brake device best shown in Figs. 1 and 12 and which has a normal position locking the fly wheel 16 and drive shaft 9 against rotation. It consists in the present instance of a braking plunger 19 having a friction shoe 20 thereon engaging an inclined surface 21 on the fly wheel 16. It is accommodated and guided in a boss 22 on the frame 2 and is normally thrust outwardly into braking engagement by a coil spring 23 acting between the bottom of the boss and a shoulder 24 on the plunger. The boss is slotted at 25 to receive two laterally projecting pins 26 on the plunger 19 that are engaged by a yoke 27 on a bell crank lever 28 pivoted at 29 beneath the boss. When the bell crank is operated it will be seen to retract the brake plunger 19 and release the fly wheel. The other arm of the bell crank 28 forms an operating lever 30 normally having the raised position shown in Fig. 1 just inside of the frame 2 to which it extends above the side rod 3 at the driving end of the machine. Therefore when the operator is turning the crank handle 18 with his right hand he must hold the brake lever 30 depressed with his left in order to keep the machine in motion and when he releases this lever 30 the machine immediately stops before it is possible for him to get either hand to the region of the knife.

Another advantage of this automatic and normally acting brake is that the machine is left locked when not in use and idle persons unfamiliar with the mechanism exploring the region of the knife cannot be injured by the knife falling by gravity as it frequently does or by other persons moving the drive wheel by brushing into it. Also in cleaning the machine it is well to be assured that the knife is not going to fall unexpectedly.

The loaf of bread is fed along the pan or guide 5 from the driving end 2 toward the cutting end 1 by what we term herein a "work holder" inasmuch as the present device is designed to actually grip the loaf but it is essentially a pusher and often used merely as such and we are therefore using the term "work holder" in this broad sense herein. This work holder is advanced or driven intermittently by the worm 8 and supported therefrom to depend into the work guide 5 just clearing the bottom thereof as shown in Fig. 6 wherein 31 indicates a fixed jaw suitably shaped and serrated as at 32 to receive and grip the lower side of the end of a loaf. It is carried at the lower end of a stem or post 32 extending downwardly from a tubular carriage 33 in which its upper end is secured and which encircles the worm 8. This carriage has a fixed handle 34 projecting out laterally to slide it up and down on the worm and a movable upper handle 35 pivoted to the lower one at 36, the two handles together constituting a hand grip. When they are pressed together they release a split nut 37 on the end of the movable handle 35 from operative threading engagement with the worm 8 and permit the carriage to slide freely but normally the nut cooperates with the worm to drive the carriage therefrom under the influence of a spring 38 encircling the pivot 36 of the handle.

We also provide an upper movable jaw 39 having teeth 40 adapted to grip the top of the loaf. This jaw may be made of sheet metal as shown and is carried by a sleeve 40ª slidable on the post 32 which latter is provided with a series of depressions 41 (Fig. 11) engaged by a rounded pin 42 projecting through the sleeve 40 and guided in a block 43 fixed to the jaw. A spring 44 within the block holds the pin in yielding engagement with the depressions 41 so that the jaw will be held in its different adjusted position when pressed down against the loaf.

As before stated the carriage 33 and its work holder are advanced intermittently by the worm 8 and the mechanism for accomplishing this and for adjusting the feed is mounted largely on the frame 2 between it and the fly wheel 16. The latter has secured to its inner face in the manner hereinafter explained an eccentric 45. A strap 46 held to the eccentric by a plate 47 screwed thereon at 48 has an arm 49 extending downwardly (Figs. 3 and 8) and pivoted at 50 to a rock arm 51 in turn pivoted on a stud 52 on the frame piece 2. Fixed to the rock arm and hence also turning on the stud is a segment 53 meshing with a pinion 54 turning freely on the worm sleeve 8. This pinion is fixed by pins 55 one of which is shown in Fig. 5 to the casing or outer member 56 of an overrunning clutch. The clutch is of a well known type best shown in Figs. 4 and 8. The inner member 57 is keyed to the worm sleeve 8 at 58 and its periphery provided with pockets 59 having clutch rollers 60 confined therein by a cover plate 61 so that when the outer clutch member 56 turns to the right it will lock within clutch member 57 and turn the sleeve 8 as shown by the arrows in Fig. 4 but when the outer member is turned in the opposite direction it will disengage itself from the inner member and the latter will remain idle. Hence, each cycle of the drive shaft 9 and eccentric 45 will swing the segment 53 to the right rotating the worm 8 a prescribed distance and will then return idly to the position of Fig. 5 so that the carriage 33 of the work holder will be advanced intermittently each impulse succeeding a cycle of the knife 11.

Of course the distance the work holder moves at each impulse will depend upon the swing of the segment 53 and this in turn depends upon the movement of the eccentric strap and the eccentricity of the eccentric. We therefore regulate the position of the latter by a simple arrangement that the operator may conveniently adjust to which end as shown in Figs. 3 and 10 the eccentric is pivoted to the fly wheel 16 at one side of the shaft 9 by means of a stud 62 having a head 63 drawn closely to the inner face of the eccentric by a locking screw 64 on the outside of the fly wheel to prevent chucking. An arcuate opening 65 in the center of the eccentric permits it a limited swinging movement across the shaft 9 about this pivot and on the other side of the shaft therefrom the periphery of the eccentric is provided with rack teeth 66 concentric to the pivot 62 and with which meshes a small pinion 67 on a shaft 68 extending through a fly wheel. On the outer side of the latter and fixed to this shaft 68 is a hand crank 69 provided with a knob 70 and in the form of an indicator coöperating with a scale 71 marked on the face of the fly wheel. This crank indicator is shown in detail in Fig. 9. It turns in proximity to an arcuate track 72 on the fly wheel which track is provided with a series of sockets 73 having a particular relationship to the different characters of the scale 71. The knob 70 also constitutes a catch, its stem 74 being guided transversely in the crank arm 69 and pressed by a spring 75 in a cavity of the latter to cause its projecting point 76 to engage with and lock selectively in any one of the sockets 73. By the adjustment of this indicator the eccentric 45 may be adjusted to any desired degree of eccentricity and the work holder be given a known length of feed at each cycle to cut a slice of the thickness desired.

We claim as our invention:

1. In a slicing machine, the combination with a horizontal work guide and a rotary knife, of feeding mechanism arranged centrally above the guide and a work holder actuated by and depending from the feeding mechanism to traverse the guide, said work holder being wholly supported by the feeding mechanism.

2. In a slicing machine, the combination with a horizontal work guide, and a rotary knife, of a drive shaft for the latter arranged centrally above the guide, an independently rotatable worm on said shaft and a work support depending from and actuated by the worm and wholly supported thereby.

3. In a slicing machine, the combination with a horizontal work guide, a rotary knife and a drive shaft for the latter arranged centrally above the work guide, of a work holder arranged to traverse the work guide and means extending longitudinally of the shaft and wholly supported thereby for supporting and feeding the work holder.

4. In a slicing machine, the combination with a horizontal work guide and a rotary knife, of feeding mechanism arranged above the guide, a carriage wholly supported on the feeding mechanism and a work holder on the carriage depending within the guide to traverse the same, and embodying a fixed jaw and a movable jaw.

5. In a slicing machine, the combination with a horizontal work guide and a rotary knife, of feeding mechanism arranged above the guide, a carriage supported on the feeding mechanism and embodying a downwardly extending notched post, and a work holder depending within the guide to traverse the same, and embodying a fixed jaw and a movable jaw, the movable jaw being provided with a latch cooperating with the notches in the post.

6. In a slicing machine, the combination with a horizontal work guide, a rotary knife and a longitudinal drive shaft for the latter arranged centrally above the guide, of a worm sleeve surrounding the shaft, a carriage comprising a split nut having a releasing handle mounted wholly on the sleeve and a work support depending from the carriage.

7. In a slicing machine, the combination with a horizontal work guide, a rotary knife and a longitudinal drive shaft for the latter arranged above the guide, of a worm sleeve surrounding the shaft, a carriage adapted to travel thereon, a work support depending from the carriage and means for driving the worm from the shaft embodying an eccentric on the latter, a swinging segment operated thereby, a gear meshing with the segment and an over-running clutch connection between the gear and worm sleeve to turn the latter intermittently in one direction.

8. In a slicing machine, the combination with a work guide, a rotary knife, a shaft therefor having a fly wheel, a work holder and feeding means for the latter, of adjustable means for actuating the feeding means intermittently embodying an eccentric pivoted to the fly wheel at one side of its center and having rack teeth on the other side of such center and a crank pivoted on the fly wheel and provided with a pinion meshing with the rack.

9. In a slicing machine, the combination with a work guide, a rotary knife, a shaft therefor having a fly wheel, a work holder and feeding means for the latter, of adjustable means for actuating the feeding means intermittently embodying an eccentric pivoted to the fly wheel at one side of its center and having rack teeth on the other side of such center and a crank pivoted on the fly wheel and provided with a pinion meshing with the rack, the crank having the form of an indicator and the fly wheel being provided with a scale therefor.

10. In a slicing machine, the combination with a knife, of hand operated driving means therefor a normally operative means for locking the driving means and manually operable means for releasing the locking means arranged at a safe distance from the knife.

11. In a slicing machine, the combination with a work guide, a rotary knife at one end thereof, work feeding devices and hand operated driving means embodying a fly wheel at the other end of the guide, of a spring brake normally locking the fly wheel and manually operable means for releasing the brake arranged at a safe distance from the knife.

SHERMAN A. THOMAS.
FRED G. YAWMAN.